US 11,386,807 B2

United States Patent
Gutierrez Morales

(10) Patent No.: US 11,386,807 B2
(45) Date of Patent: Jul. 12, 2022

(54) STETHOSCOPE CHEST PIECE HOLDER

(71) Applicant: Boorpus, LLC, Miramar, FL (US)

(72) Inventor: Christian Raul Gutierrez Morales, Miramar, FL (US)

(73) Assignee: Boorpus, LLC, Miramar, FL (US)

( * ) Notice: Subject to any disclaimer, the term of this patent is extended or adjusted under 35 U.S.C. 154(b) by 940 days.

(21) Appl. No.: 16/006,928

(22) Filed: Jun. 13, 2018

(65) Prior Publication Data
US 2019/0385484 A1    Dec. 19, 2019

Related U.S. Application Data
(60) Provisional application No. 62/524,777, filed on Jun. 26, 2017.

(51) Int. Cl.
G09B 23/28    (2006.01)
F16B 2/06    (2006.01)
F16B 2/12    (2006.01)

(52) U.S. Cl.
CPC .............. G09B 23/28 (2013.01); F16B 2/06 (2013.01); F16B 2/12 (2013.01)

(58) Field of Classification Search
CPC ...... F16B 2/06; F16B 2/12; F16B 2/24; F16B 2/20; F16B 2/243; F16B 2/245; F16B 2/04; G09B 23/28
See application file for complete search history.

(56) References Cited

U.S. PATENT DOCUMENTS

| | | | | |
|---|---|---|---|---|
| 8,550,413 B2 * | 10/2013 | Warrick | ............... | B01L 9/50 248/229.22 |
| 9,552,745 B1 * | 1/2017 | Gutierrez Morales | ............... | G09B 23/28 |
| 9,601,031 B1 * | 3/2017 | Gutierrez Morales | .. | A61B 7/02 |
| 2004/0076303 A1 * | 4/2004 | Vyshedskly | ............. | A61B 7/04 381/67 |

FOREIGN PATENT DOCUMENTS

| | | | | |
|---|---|---|---|---|
| WO | WO-03063707 A1 * | 8/2003 | ............. | A61B 7/04 |
| WO | 2017204841 A1 | 7/2017 | | |
| WO | WO-2018034313 A1 * | 2/2018 | ............. | A61B 7/003 |

OTHER PUBLICATIONS

BATCLIP stethoscope leather clip-on hip holder sold on amazon.com, https://www.amazon.com/BATCLIP-black-clip-stethoscope-misplacement/dp/B0038S8E9U first available date: Jun. 15, 2015 (Year: 2015).*

* cited by examiner

*Primary Examiner* — Terrell L McKinnon
*Assistant Examiner* — Ding Y Tan
(74) *Attorney, Agent, or Firm* — Christopher & Weisberg, P.A.

(57) ABSTRACT

A stethoscope chest piece holder for use with a medical attachment device, the stethoscope chest piece holder including a clamp defining an adjustable aperture sized to receive a stethoscope chest piece therein and being configured to secure the stethoscope chest piece proximate the medical attachment device.

17 Claims, 9 Drawing Sheets

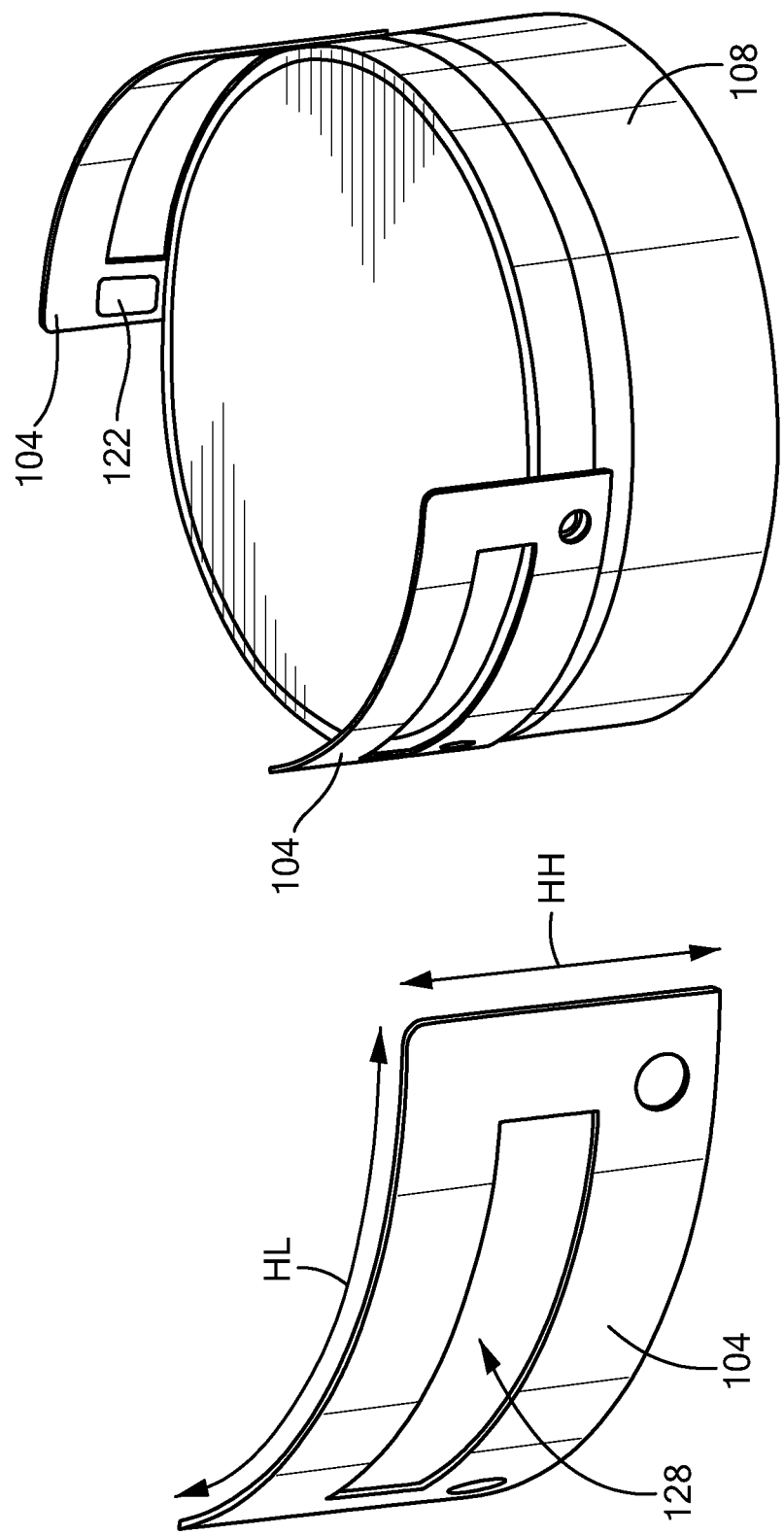

STETHOSCOPE CHEST PIECE HOLDER

CROSS-REFERENCE TO RELATED APPLICATION

This application is related to and claims priority to U.S. Provisional Patent Application Ser. No. 62/524,777, filed Jun. 26, 2017, entitled STETHOSCOPE CHEST PIECE HOLDER, the entirety of which is incorporated herein by reference.

STATEMENT REGARDING FEDERALLY SPONSORED RESEARCH OR DEVELOPMENT n/a

TECHNICAL FIELD

The present invention relates generally to auscultation training, and, more particularly, to a stethoscope chest piece holder for coupling a stethoscope chest piece to a medical device configured to emit body sounds.

BACKGROUND

Auscultation training is often conducted as part of medical education. Auscultation is the act of listening to sounds from the heart, lungs, or other body parts, typically with a stethoscope, as a part of medical diagnosis. During auscultation training, standardized patients are often used to mimic symptoms of a real patient. As a drawback, standardized patients are typically unable to simulate pathologies involving findings such as heart murmurs, abnormal lung, or abnormal abdominal sounds. Therefore, systems that improve upon auscultation training have been developed. For example, known systems which couple to a stethoscope may include an embedded speaker which plays pre-recorded digital audio files at the command of an instructor to mimic real patient symptoms. Such systems typically do not include a stethoscope chest piece holder that allows a user, such as a medical student, to easily and conveniently couple the system to variously sized stethoscopes. Known stethoscope chest piece holders are size specific, difficult to use, or involve numerous moving parts which increase the expense and complexity of manufacturing.

SUMMARY

Some embodiments advantageously provide a stethoscope chest piece holder for use with a medical attachment device, the stethoscope chest piece holder including a clamp defining an adjustable aperture sized to receive a stethoscope chest piece therein and being configured to secure the stethoscope chest piece proximate the medical attachment device.

In another aspect of this embodiment, the clamp includes a wall defining the adjustable aperture.

In another aspect of this embodiment, the clamp includes a first movable member and a second movable member opposite the first movable member, the first movable member and the second movable member defining a clamp axis extending therethrough along the adjustable aperture.

In another aspect of this embodiment, the first movable member and the second movable member are push-buttons.

In another aspect of this embodiment, the first movable member and the second movable member are movable relative to each other to define the adjustable aperture.

In another aspect of this embodiment, the stethoscope chest piece holder includes a first retaining member and a second retaining member opposite the first retaining member, the first retaining member and the second retaining member at least partially defining the adjustable aperture.

In another aspect of this embodiment, the first retaining member and the second retaining member are made of a friction material and are sized to contact the stethoscope chest piece.

In another aspect of this embodiment, the stethoscope chest piece holder includes one or more handles each defining a slit for receiving a portion of the clamp therein.

In another aspect of this embodiment, the clamp includes a first movable member and a second movable member opposite the first movable member, the first movable member and the second movable member being larger than the slit of the handles.

In another aspect of this embodiment, the handles are configured to couple to a medical attachment device.

In another aspect of this embodiment, the handles face each other and at least partially surround the adjustable aperture.

In another aspect of this embodiment, the clamp includes one or more walls including one or more outer walls, one or more side walls coupled to the outer walls, and one or more main walls coupling the side walls to each other.

In another aspect of this embodiment, the main walls define an adjustable distance therebetween, the adjustable distance corresponding to a size of the adjustable aperture.

In another aspect of this embodiment, the clamp includes a resting state and an active state, the adjustable distance being a first distance in the resting state and a second distance in the active state, the second distance being smaller than the first distance.

In another aspect of this embodiment, the active state includes the stethoscope chest piece being coupled to the stethoscope chest piece holder.

In another aspect of this embodiment, a size of the adjustable aperture is between 32 mm to 50 mm.

In another embodiment, an assembly for holding a stethoscope chest piece is provided, the assembly including a stethoscope chest piece holder having a clamp defining an adjustable aperture sized to receive the stethoscope chest piece therein and a handle defining a slit for receiving a portion of the clamp therein. The assembly may also include a stethoscope sized to be held within the clamp.

In another aspect of this embodiment, the clamp includes a wall, a first movable member, and a second movable member defining a size of the adjustable aperture.

In another aspect of this embodiment, the handle is configured to be coupled to a medical attachment device having a memory for storing one or more body sounds.

In another embodiment, a stethoscope holder is provided including a clamp having one or more walls defining an adjustable aperture for receiving a stethoscope chest piece therein, the walls including one or more outer walls facing each other and defining a clamp axis extending therethrough, one or more side walls proximate the outer walls, and one or more main walls coupling the side walls to each other. The clamp may also include one or more movable members coupled to the outer walls and one or more handles defining a slit shaped to be disposed between the movable members and the side walls of the clamp.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 3 is a perspective view of the handles of FIG. 1;

FIG. 4 is a perspective view of the handles of FIG. 1 coupled to a medical attachment device;

DETAILED DESCRIPTION

As used here, relational terms, such as "first" and "second," "top" and "bottom," "front and rear," and the like, may be used solely to distinguish one entity or element from another entity or element without necessarily requiring or implying any physical or logical relationship or order between such entities or elements.

Figure 1:
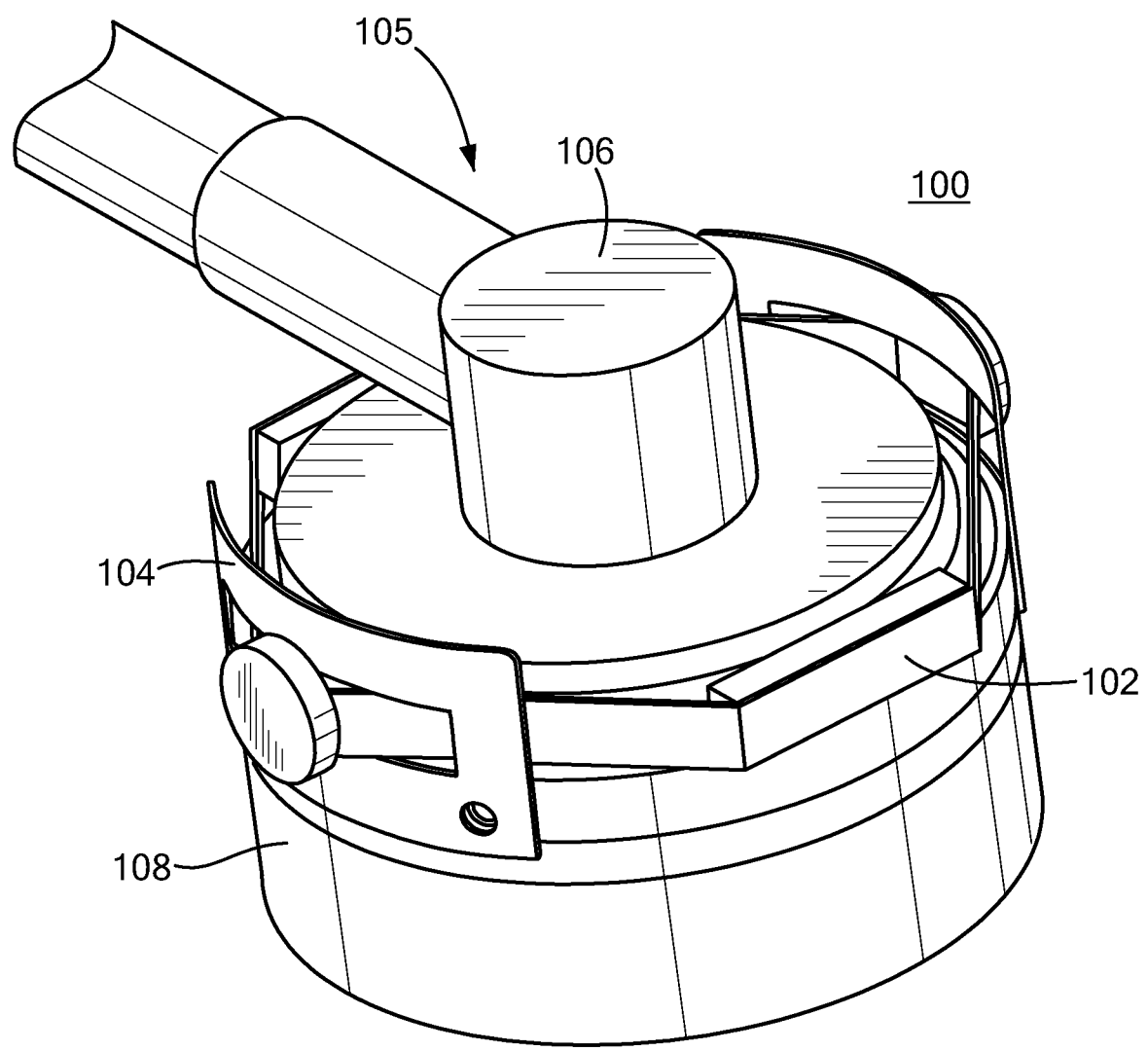
FIG. 1 is a perspective view of a stethoscope chest piece holder including a clamp and one or more handles, the stethoscope chest piece holder having a stethoscope coupled thereto in accordance with the present invention.

Referring now to the drawings in which like reference designators refer to like elements, there is shown in FIG. 1 an exemplary stethoscope chest piece holder in accordance with the present invention and designated generally as "100." The stethoscope chest piece holder 100 may be referred to herein as "the holder" and may include a clamp 102 or the clamp 102 and one or more handles, such as a pair of handles 104. The holder 100 is configured to hold a portion of a medical device, such as a stethoscope 105 including a stethoscope chest piece 106, proximate to a medical attachment device 108 to simulate a medical diagnostic situation. The term "proximate" includes the chest piece 106 being in direct contact with the medical attachment device 108 or within 0.5 inches of the medical attachment device 108. The chest piece 106 may be single-sided including a diaphragm or may be dual-sided including the diaphragm and a bell. The stethoscope 105 and the holder 100 may be provided as an assembly.

The medical attachment device 108 may be a device or system having a speaker, a memory for storing body sounds, and a processor. The processor may be configured to cause the speaker to emit the body sounds from the memory, such as during auscultation training, to mimic the practice of medical diagnosis. For example, and without limitation, the medical attachment device 108 may be that which is disclosed in commonly owned U.S. Pat. Nos. 9,552,745 and 9,601,031 incorporated by reference herein in the entirety. The body sounds may be associated with the lungs, heartbeat, blood flow, and the like. In one example, the chest piece 106 may be held proximate to a simulated patient or manikin's heart and the medical attachment device 108 may emit heart sounds from the speaker embedded within the medical attachment device 108.

Figure 2:
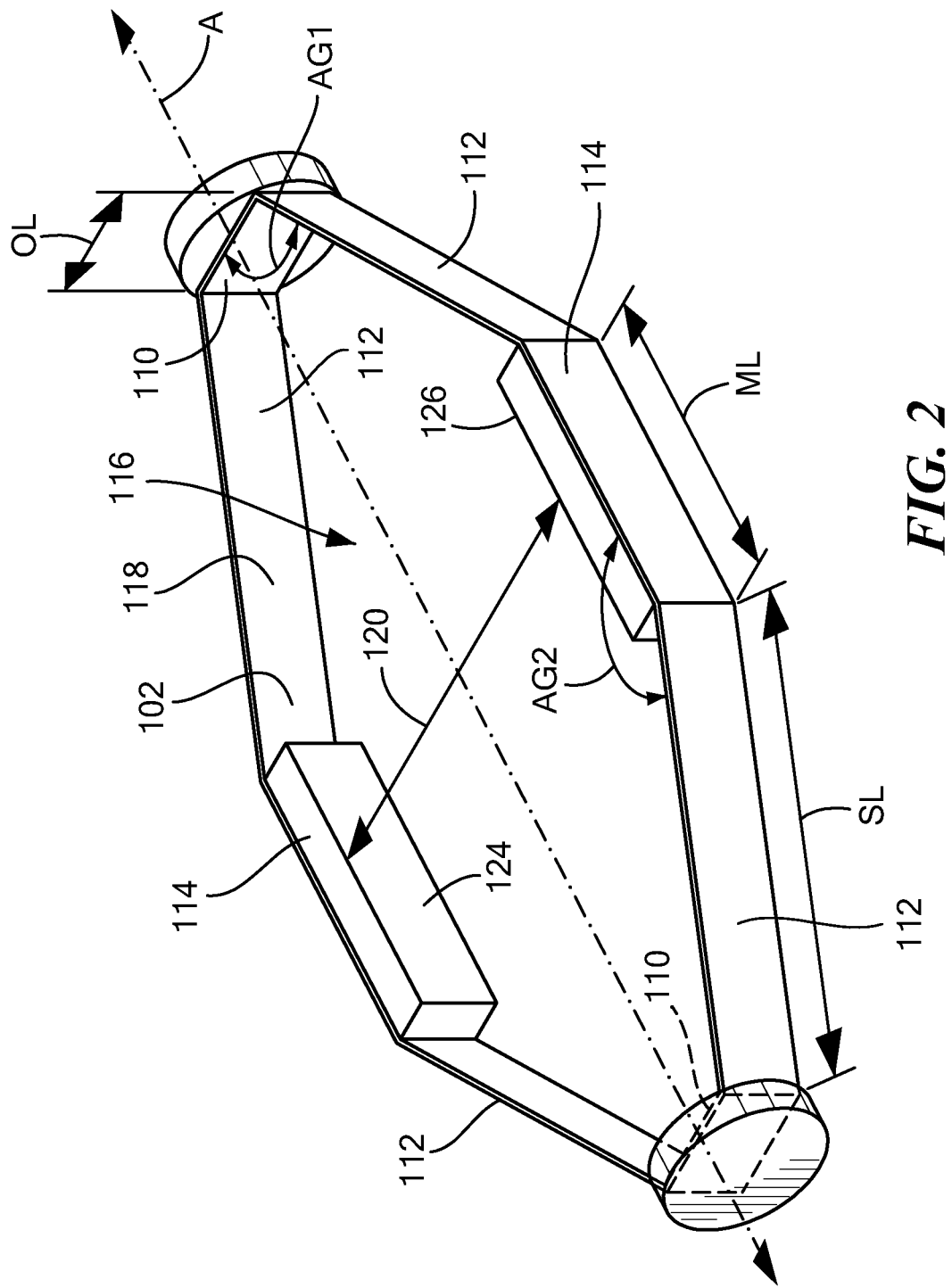
FIG. 2 is a perspective view of the clamp of FIG. 1.

With reference to FIG. 2, the clamp 102 defines an adjustable aperture 116 sized to receive the stethoscope chest piece 106 (FIG. 1) or another medical device therein. In particular, the clamp 102 may include one or more walls defining the aperture 116 with the walls being a single unit or multiple units coupled together. The single and multiple unit configurations may provide the same or a similar visual appearance relative to each other.

In one example, the clamp 102 may include a pair of outer walls 110 facing each other and defining a clamp axis "A" extending therethrough. One or more side walls 112, such as four side walls 112, may each be proximate or coupled to one of the outer walls 110 and a pair of main walls 114 may couple each of the side walls 112 to each other. More or less walls may be included and the single or multiple configurations may define the adjustable aperture in a number of various shapes such as octagon, round, oval, etc.

In one exemplary configuration, the outer walls 110 includes a length generally designated as "OL", between 0.2 inches to 0.4 inches, such as 0.3 inches. In such a configuration, the side walls 112 include a length, generally designated as "SL", between 1.0 inch to 1.2 inches, such as 1.1 inches, and the main walls 114 include a length generally designated as "ML", between 0.6 inches to 0.8 inches, such as 0.78 inches. In other configurations, the length of the walls may vary outside of these ranges. In one configuration, the outer walls 110 and the side walls 112 may define a 115-degree to 125-degree angle therebetween, such as a 120-degree angle, generally designated as "AG1." In such configuration, the side walls 112 and the main walls 114 may define a 145-degree to 155-degree angle therebetween, such as a 150-degree angle, generally designated as "AG2." In other configurations, the angles may vary outside of these ranges.

Referring still to FIG. 2, the size of the aperture 116 may be at least partially defined by a distance 120 which separates the main walls 114 from each other. The clamp 102 may be made of an elastic material, such as stainless-steel, which is configured to contract and resume an original shape after contraction. In other words, the material is configured to flex and retract to increase and decrease the distance 120 between the main walls 114 to accommodate variously sized stethoscope chest pieces or other medical devices held therein. In other configurations, the clamp 102 may be made of another material, such as a polymeric material, rubber, or the like, in the form of a fastener and strap or another mechanical assembly suitable for positioning the holder 100 proximate the medical attachment device 108.

In one example, and without limitation, the aperture 116 may be between 32 mm to 50 mm taking into account a first retaining member 124 and a second retaining member 126 which may be coupled to the main walls 114. As such, the holder 100 may accommodate stethoscope diaphragms having dimensions between 35 mm to 48 mm and stethoscope bells having dimensions between 22 mm to 27 mm for use in examining a human child, adult, and/or an animal. The holder 100 may be also be pliable and relatively inexpensive and simple to manufacture as a result of the minimal moving parts and materials.

The clamp 102 may be configured to secure the chest piece holder 106 proximate to the medical attachment device 108 by surrounding the medical attachment device 108. In the alternative, with reference to FIGS. 3 and 4, the holder 100 may include one or more handles 104, such as a pair of handles 104, configured to be coupled to the medical attachment device 108. The handles 104 may include a length, generally designated as "HL," between 1.2 inches to 1.4 inches, such as 1.3 inches, and a height, generally designated as "HH," between 0.5 inches to 0.60 inches, such as 0.55 inches. Such dimensions are provided for exemplary purposes as the handles 104 may vary in length and height.

The handles 104 may include a retention member 122, such as a rubber stopper, to secure the chest piece 106 between the handles 104 in a stationary position. Although two handles 104 are shown, the holder 100 may include more or less handles 104 made of a rigid material, such as steel, that is not prone to easily bending or flexing. The handles 104 may be fixedly or removably coupled to the medical attachment device 108 using welding, adhesive, or another suitable fastening mechanism.

Figure 5:
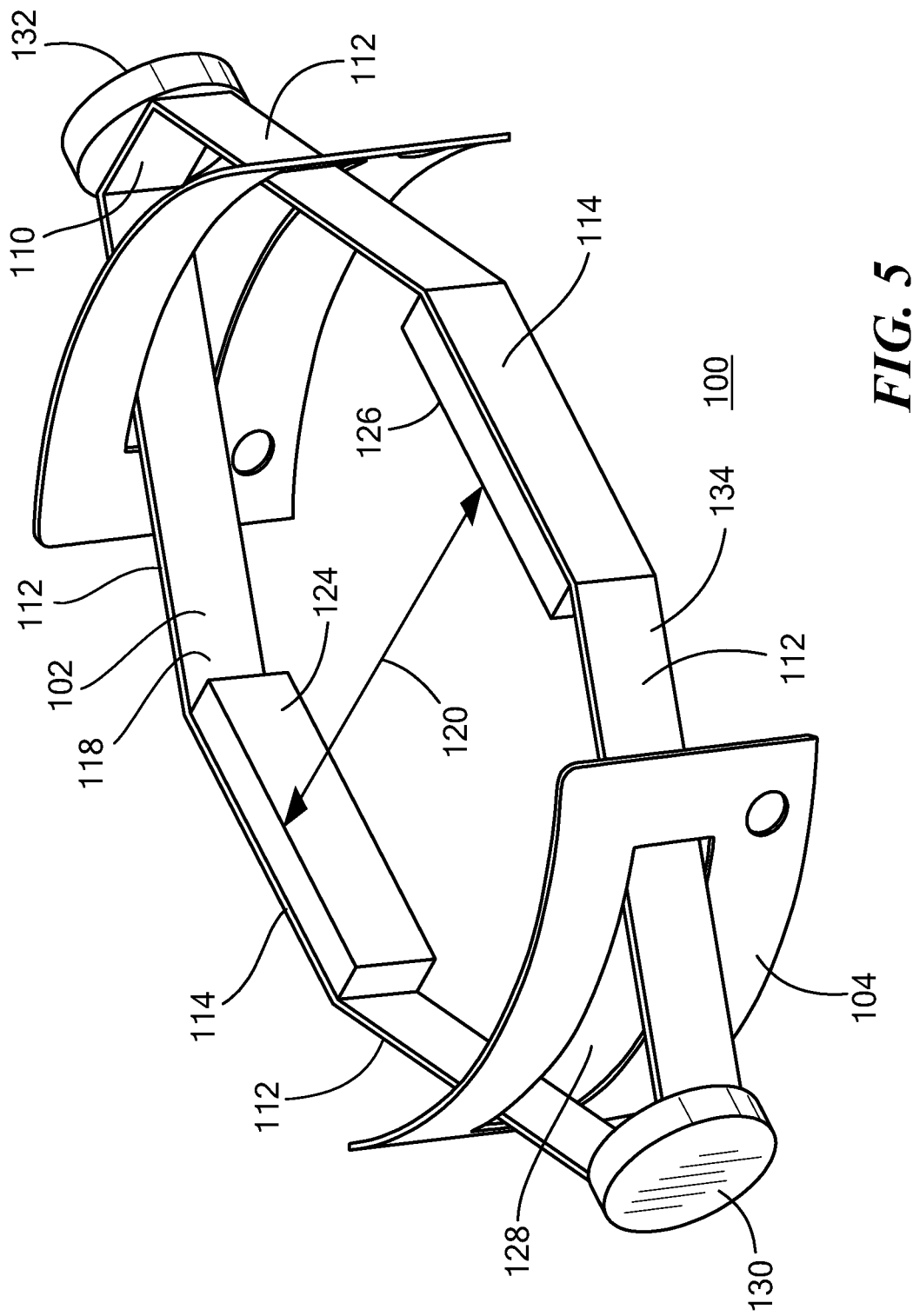
FIG. 5 is a perspective view of the stethoscope chest piece holder of FIG. 1.
Figure 10:
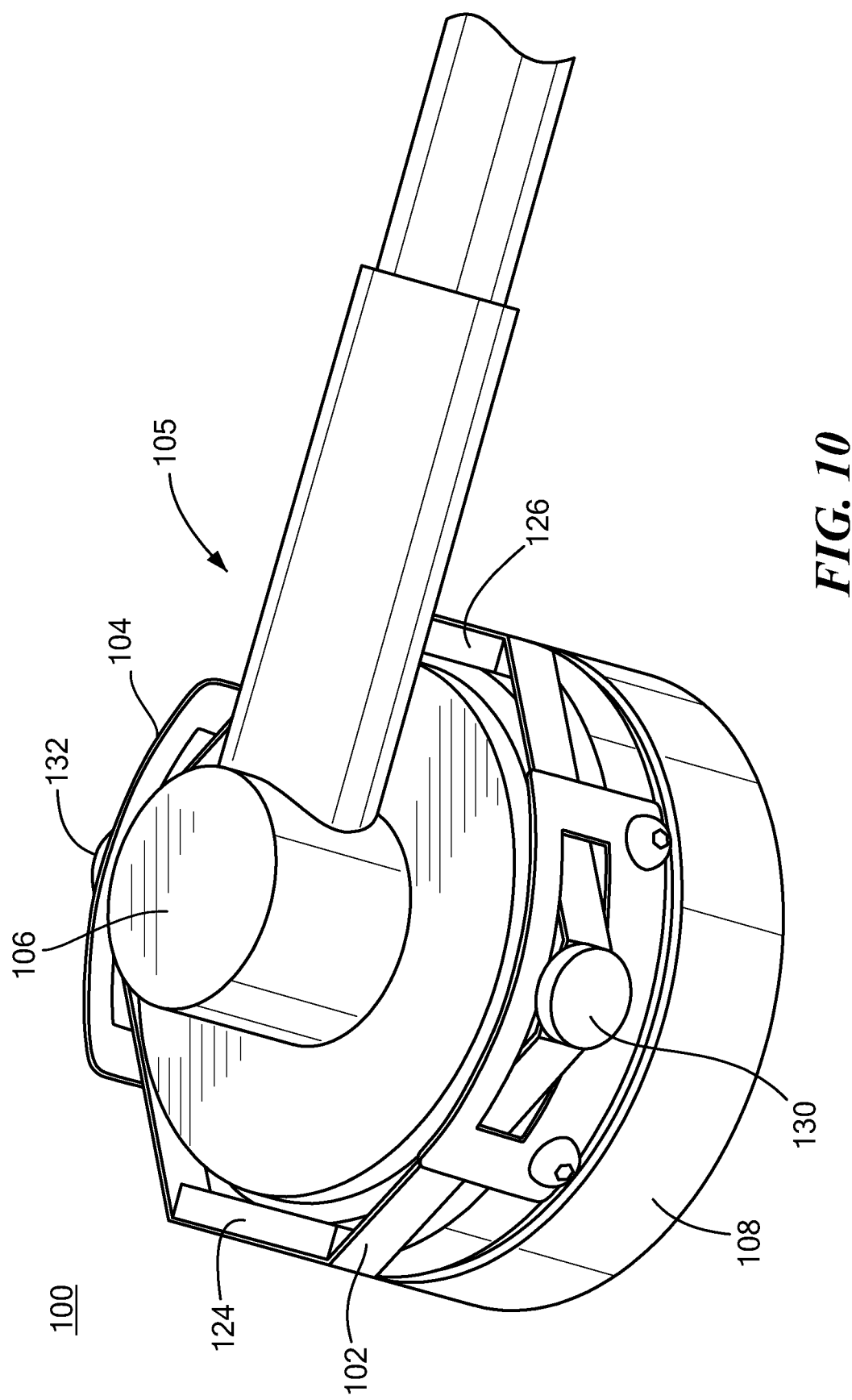
FIG. 10 is a perspective view of the stethoscope chest piece holder of FIG. 1 in the active configuration including a stethoscope being coupled thereto, the stethoscope chest piece holder being coupled to the medical attachment device.

The handles 104 define a slit 128 for receiving a portion of the clamp 102 therein. For example, FIG. 5 depicts a perspective view of the clamp 102 including the outer walls 110 and the side walls 112 inserted into the slit 128 during use of the holder 100. The main walls 114 include the first retaining member 124 and the second retaining member 126 coupled to the inner surface 118 to retain the chest piece 106 within the clamp 102 (FIG. 10). In one configuration, the first retaining member 124 and the second retaining member 126 are made of a friction material, such as that in the form of neoprene rubber pads, which have relatively high friction properties to provide resistance and limit movement of the chest piece 106 when within the clamp 102. In other configurations, the retaining members 124 and 126 may be clips, hooks, or another type of retaining member suitable for retaining the chest piece 106 within the clamp 102.

In one configuration, a first movable member 130 and a second movable member 132 may be coupled to an outer surface 134 of the clamp 102, such as by welding or adhesive, to form an outermost portion of the clamp 102. During manufacturing of the clamp 102, the outer walls 110 may be inserted through the slit 128 and the first and second movable members 130 and 132 may thereafter be coupled to the outer walls 110. In other configurations, the first movable member 130 and the second movable member 132 may be coupled to the inner surface 118 or another portion of the clamp 102. The first and second movable members 130 and 132 may be push-buttons having dimensions larger than a width of the slit 128 to prevent the first and second movable members 130 and 132 from sliding through the slit 128. As such, the handles 104 are shaped to be disposed between the movable members 130 and 132 and the main walls 114. Alternatively, the first and the second movable members 130 and 132 may be knobs, handles or the like.

Figure 6:
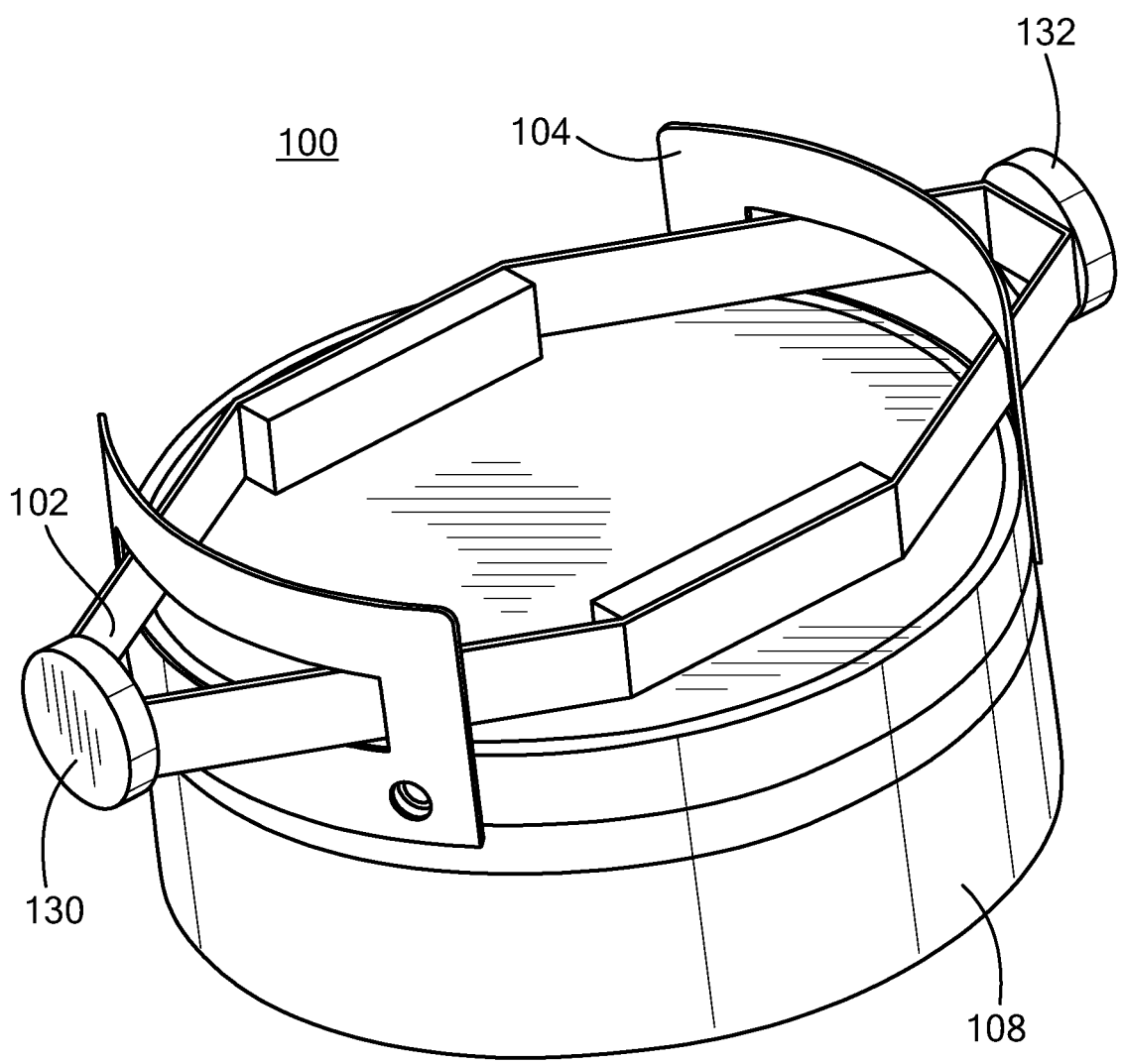
FIG. 6 is a perspective view of the stethoscope chest piece holder of FIG. 1 in a resting configuration without the stethoscope coupled thereto, the stethoscope chest piece holder being coupled to the medical attachment device.
Figure 7:
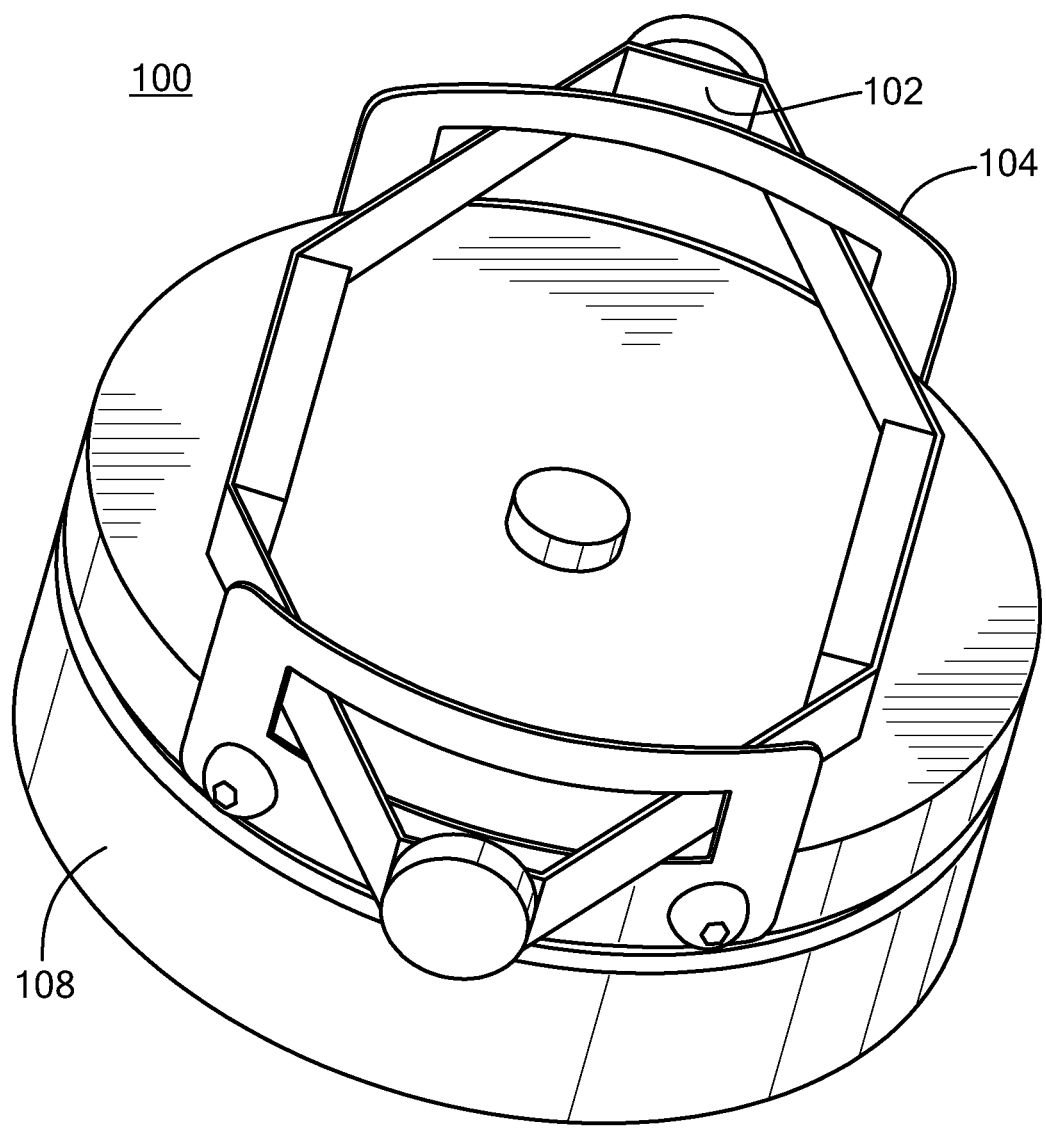
FIG. 7 is a perspective view of the stethoscope chest piece holder of FIG. 1 in the resting configuration of FIG. 6, the stethoscope chest piece holder being coupled to the medical attachment device.
Figure 8:
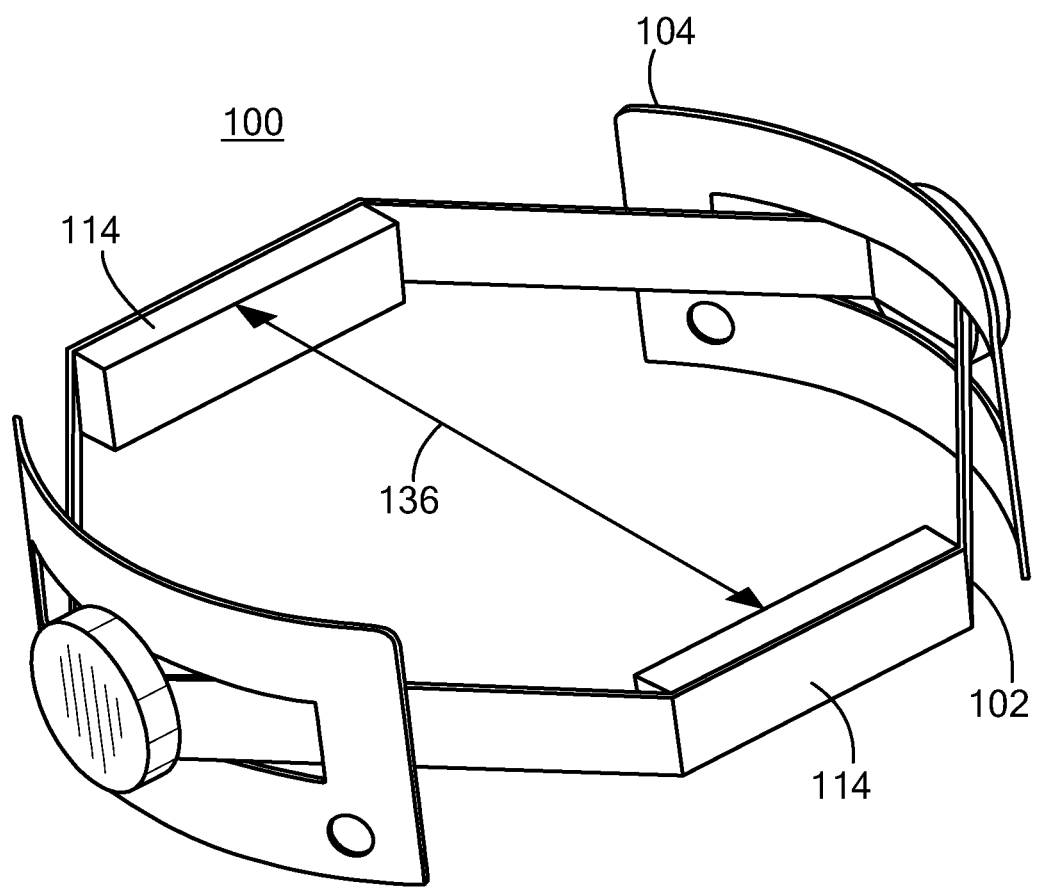
FIG. 8 is a perspective view of the stethoscope chest piece holder of FIG. 1 in an active configuration prior to the stethoscope being coupled thereto.
Figure 9:
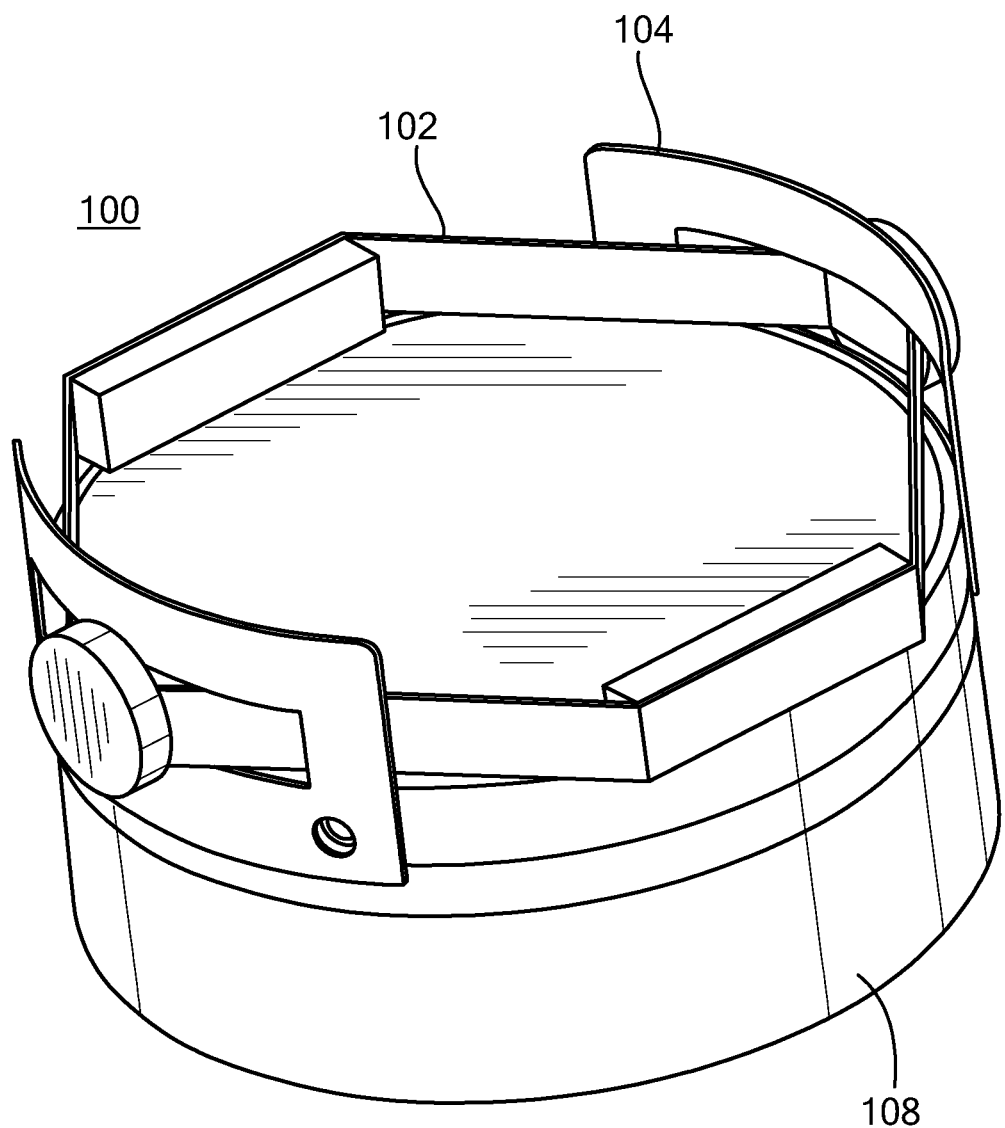
FIG. 9 is a perspective view of the stethoscope chest piece holder of FIG. 1 in the active configuration of FIG. 8, the stethoscope chest piece holder being coupled to the medical attachment device.

The first and second movable members 130 and 132 may be pushed toward each other to transition the clamp 102 from a resting state, as shown in FIGS. 5-7, to an active state, as shown in FIGS. 8-10. In the resting state, the chest piece 106 is unattached to the holder 100 and in the active state, the chest piece 106 is held within the clamp 102. By pressing the first and second movable members 130 and 132 toward each other, the user increases the distance 120 between the main walls 114 to insert the chest piece 106 between the main walls 114. In other words, the first and second movable members 130 and 132 are movable relative to each other to adjust the size of the aperture 116.

For example, FIG. 5 depicts the distance 120 between the main walls 114 in the resting state as a first distance that is shorter than, as shown in FIG. 8, a second distance 136 between the main walls 114 in the active state. The clamp 102 can be transitioned from the resting state to the active state in a relatively quick and simple manner which may be desirable during specified events, such as auscultation training, that mimic emergency medical situations. As such, the simulation is not disrupted and a user of the holder 100 can focus on treating a simulated patient or ill manikin. In other words, the user may spend an increasing amount of time assessing the manikin or simulated patient than that which would be allotted using a stethoscope or other medical device holder that is difficult to assemble and attach to the stethoscope.

With reference to FIG. 9, the holder 100 is depicted as being coupled to the medical attachment device 108, whereas FIG. 10 depicts the chest piece 106 positioned within the clamp 102, such as that which occurs when the movable members 130 and 132 are released by the user. In the active state, the retaining members 124 and 126 press firmly against the chest piece 106 and the friction between the retaining members 124 and 126 and the chest piece 106 maintains the chest piece 106 stationary and proximate to the medical attachment device 108. The holder 100 may be configured to position the medical attachment device 108 in direct contact with the chest piece 106 or within 0.5 inches of the chest piece 106 in a parallel manner or the medical attachment device 108 may be angled relative to the chest piece 106. In order to release the chest piece 106 from the clamp 102, the user may press the movable members 130 and 132 to increase the size of the aperture 116 and pull the chest piece away from the medical attachment device 108. Upon releasing the movable members 130 and 132, the clamp 102 returns to the resting state.

Although applications have been discussed herein that relate to auscultation training, it will be understood that the principles and devices disclosed herein may also be used in other industries as well. Further, it will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope the invention.

What is claimed is:

1. A stethoscope chest piece holder for use with a medical attachment device, the stethoscope chest piece holder comprising:
   a clamp defining an adjustable aperture sized to receive a stethoscope chest piece therein and being configured to secure the stethoscope chest piece proximate the medical attachment device; and
   a plurality of handles defining a plurality of slits for receiving a portion of the clamp therein, each handle of the plurality of handles defining one slit of the plurality of slits, the plurality of handles each partially defining the adjustable aperture.

2. The stethoscope chest piece holder of claim 1, wherein the clamp includes a wall partially defining the adjustable aperture.

3. A stethoscope chest piece holder for use with a medical attachment device, the stethoscope chest piece holder comprising:
   a clamp defining an adjustable sized aperture sized to receive a stethoscope chest piece therein and being configured to secure the stethoscope chest piece proximate the medical attachment device;

a plurality of handles each defining a slit for receiving a portion of the clamp therein;

the clamp includes a first movable member and a second movable member opposite the first movable member, the first movable member and the second movable member defining a clamp axis extending therethrough along an adjustable aperture; and the first movable member and the second movable member are push-buttons.

4. The stethoscope chest piece holder of claim 1, wherein a first movable member and a second movable member are movable relative to each other to define the adjustable aperture.

5. The stethoscope chest piece holder of claim 1, further comprising a first retaining member and a second retaining member opposite the first retaining member, the first retaining member and the second retaining member at least partially defining the adjustable aperture.

6. The stethoscope chest piece holder of claim 5, wherein the first retaining member and the second retaining member are made of a friction material and are sized to contact the stethoscope chest piece.

7. The stethoscope chest piece holder of claim 1, wherein the clamp includes a first movable member and a second movable member opposite the first movable member, the first movable member and the second movable member being larger than the plurality of slits of the plurality of handles.

8. The stethoscope chest piece holder of claim 1, wherein the plurality of handles are configured to couple to a medical attachment device.

9. The stethoscope chest piece holder of claim 1, wherein the plurality of handles face each other and at least partially surround the adjustable aperture.

10. The stethoscope chest piece holder of claim 1, wherein the clamp includes a plurality of walls including a plurality of outer walls, a plurality of side walls coupled to the plurality of outer walls, and a plurality of main walls coupling the plurality of side walls to each other.

11. The stethoscope chest piece holder of claim 10, wherein the plurality of main walls define an adjustable distance therebetween, the adjustable distance corresponding to a size of the adjustable aperture.

12. The stethoscope chest piece holder of claim 11, wherein the clamp includes a resting state and an active state, the adjustable distance being a first distance in the resting state and a second distance in the active state, the second distance being smaller than the first distance.

13. The stethoscope chest piece holder of claim 12, wherein the active state includes the stethoscope chest piece being coupled to the stethoscope chest piece holder.

14. The stethoscope chest piece holder of claim 1, wherein a size of the adjustable aperture is between 32 mm to 50 mm.

15. A stethoscope holder, comprising:

a clamp including:
   a plurality of walls defining an adjustable aperture for receiving a stethoscope chest piece therein, the plurality of walls including:
      a plurality of outer walls facing each other and defining a clamp axis extending therethrough;
      a plurality of side walls proximate the plurality of outer walls; and
      a plurality of main walls coupling the plurality of side walls to each other; and
   a plurality of movable members coupled to the plurality of outer walls; and a plurality of handles each defining a slit for receiving a portion of the clamp, the plurality of handles each partially defining the adjustable aperture.

16. The stethoscope chest piece holder of claim 1, wherein the clamp includes:

a first movable member and a second movable member opposite the first movable member, the first movable member and second movable member defining a major longitudinal axis therethrough;

a first retaining member and a second retaining member opposite the first retaining member, the first retaining member and the second retaining member together defining a transverse axis orthogonal to the major longitudinal axis; and the first movable member and the second movable member being orthogonal from the first retaining member and second retaining member.

17. The stethoscope chest piece holder of claim 16, wherein the first movable member and the second movable member of the clamp extend through one slit of the plurality of slits and are sized larger than each slit; and the first movable member and the second movable member are movable with respect to each other along the major longitudinal axis when extended through each slit.

* * * * *